United States Patent
Söderholm et al.

(10) Patent No.: US 9,979,260 B2
(45) Date of Patent: May 22, 2018

(54) METHOD AND DEVICE FOR LIQUID COOLING OF AN ELECTRIC MOTOR

(71) Applicant: BAE Systems Hägglunds Aktiebolag, Örnsköldsvik (SE)

(72) Inventors: Anders Söderholm, Domsjö (SE); Viktor Lassila, Arnäsvall (SE)

(73) Assignee: BAE Systems Hägglunds Aktiebolag, Örnsköldsvik (SE)

( * ) Notice: Subject to any disclaimer, the term of this patent is extended or adjusted under 35 U.S.C. 154(b) by 418 days.

(21) Appl. No.: 14/441,365

(22) PCT Filed: Oct. 24, 2013

(86) PCT No.: PCT/SE2013/051243
§ 371 (c)(1),
(2) Date: May 7, 2015

(87) PCT Pub. No.: WO2014/074051
PCT Pub. Date: May 15, 2014

(65) Prior Publication Data
US 2015/0288254 A1    Oct. 8, 2015

(30) Foreign Application Priority Data
Nov. 7, 2012    (SE) ...................................... 1251264

(51) Int. Cl.
*H02K 9/19* (2006.01)
*H02K 1/32* (2006.01)

(52) U.S. Cl.
CPC ................ *H02K 9/19* (2013.01); *H02K 1/32* (2013.01)

(58) Field of Classification Search
CPC .. H02K 1/30; H02K 1/32; H02K 9/00; H02K 9/005; H02K 9/10; H02K 9/19
See application file for complete search history.

(56) References Cited

U.S. PATENT DOCUMENTS

| | | |
|---|---|---|
| 2004/0066098 A1 | 4/2004 | Doherty et al. |
| 2006/0103252 A1 | 5/2006 | Yokota |
| | (Continued) | |

FOREIGN PATENT DOCUMENTS

| | | | |
|---|---|---|---|
| DE | 102010038529 A1 | 2/2012 | |
| JP | 2003-169448 A | 6/2003 | |
| JP | 2004-282902 A | 10/2004 | |
| JP | 2006248417 A * | 9/2006 | ............... H02K 9/19 |
| JP | 2009-261137 A | 11/2009 | |

OTHER PUBLICATIONS

Office Action received for Chinese Patent Application No. 201380057186.8 dated Dec. 2, 2016, 16 Pages (6 pages of English Translation and 10 pages of Official Copy).

(Continued)

*Primary Examiner* — Tran Nguyen
(74) *Attorney, Agent, or Firm* — Morrison & Foerster LLP

(57) ABSTRACT

The invention relates to a method for liquid cooling of an electric motor of inner rotor type having a rotor of hub type and a stator provided with windings. The method includes supplying a cooling liquid for cooling to at least one end of the hub of the rotor, feeding supplied cooling liquid at least radially in the hub by means of the rotation of the hub, and by means of the rotation of the rotor throwing thus fed cooling liquid towards the stator. The invention also relates to a device and a platform to practice the method.

13 Claims, 3 Drawing Sheets

(56) References Cited

U.S. PATENT DOCUMENTS

| | | |
|---|---|---|
| 2009/0121562 A1 | 5/2009 | Yim |
| 2010/0045125 A1 | 2/2010 | Takenaka et al. |
| 2010/0141062 A1 | 6/2010 | Chamberlin et al. |
| 2011/0012448 A1* | 1/2011 | Tanaka .................... H02K 1/32 310/54 |
| 2011/0074233 A1* | 3/2011 | Okada .................... H02K 1/32 310/54 |
| 2011/0273040 A1* | 11/2011 | Chamberlin ............ H02K 1/32 310/59 |
| 2012/0112574 A1 | 5/2012 | Bradfield |

OTHER PUBLICATIONS

Extended European Search Report (includes Supplementary European Search Report and Search Opinion) received for European Patent Application No. 13853210.6, dated Jun. 23, 2016, 9 pages.

International Search Report and Written Opinion received for PCT Patent Application No. PCT/SE2013/051243, dated Feb. 13, 2014, 9 pages.

International Preliminary Report on Patentability received for PCT Patent Application No. PCT/SE2013/051243, dated May 21, 2015, 6 pages.

Search Report and Written Opinion received for Singaporean Patent Application No. 11201503172U, dated Mar. 29, 2016, 6 pages.

Office Action received for Swedish Patent Application No. 1251264-6, dated May 10, 2013, 4 pages (Official Copy only) (See Communication under 37 CFR § 1.98 (3).

Intention to Grant received for European Patent Application No. 13853210.6 dated Jun. 28, 2017, 52 Pages.

Office Action received for Chinese Patent Application No. 201380057186.8, dated Dec. 4, 2017, 16 pages (6 pages of English Translation and 10 pages of Official Copy).

Decision to Grant received for European Patent Application No. 13853210.6, dated Nov. 9, 2017, 2 pages.

* cited by examiner

METHOD AND DEVICE FOR LIQUID COOLING OF AN ELECTRIC MOTOR

CROSS REFERENCE TO RELATED APPLICATIONS

This application is a U.S. National Stage patent application of PCT/SE2013/051243, filed on Oct. 24, 2013, which claims priority to Swedish Patent Application No. 1251264-6, filed on Nov. 7, 2012, the entire contents of which are incorporated herein by reference.

FIELD OF THE INVENTION

The invention relates to a method for liquid cooling of an electric motor according to the preamble of claim 1. The invention relates to a device for liquid cooling of an electric motor according to the preamble of claim 8. The invention also relates to a platform.

BACKGROUND OF THE INVENTION

During drive electric motors are heated whereby cooling is required to divert the heat. Cooling of an electric motor may be effected by means of different types of cooling media such as e.g. air, water or oil.

In high performance electric motors efficient cooling is highly essential in order to achieve good performance. Cooling of the active parts of the electric motor directly affects the performance. Liquid cooling by means of e.g. oil may hereby result in efficient cooling.

Electric motors with rotor of so called hub design, i.e. where the rotor comprises a hub member comprising a ring shaped cylindrical portion, where according to a variant the plates of the rotor are arranged external to the hub member, in order to thus reduce the amount of rotor plates for the purpose of cost savings. Further such an electric motor with rotor of hub design becomes lighter. Such an electric motor has the corresponding need for cooling.

An object of the present invention is to provide a method for liquid cooling of an electric motor which results in easy and efficient cooling of the electric motor.

An object of the present invention is to provide a device for liquid cooling of an electric motor which results in easy and efficient cooling of the electric motor.

SUMMARY OF THE INVENTION

These and other objects, apparent from the following description, are achieved by a method, a device and a platform which are of the type stated by way of introduction and which in addition exhibits the features described below. Preferred embodiments of the method and the device are defined in the disclousre below.

According to the invention the objects are achieved with a method for liquid cooling of an electric motor of inner rotor type comprising a rotor of hub type and a stator provided with windings, comprising the steps of: supplying a liquid for said cooling to at least one end of the hub of said rotor and to feed supplied cooling liquid at least radially in said hub by means of the rotation of said hub, and by means of the rotation of the rotor throw thus fed cooling liquid towards said stator. Hereby the liquid for cooling comes into direct contact or in the vicinity of parts of the rotor creating losses, to thereafter be thrown towards the stator, particularly the stator windings and its coil ends, wherein consequently efficient cooling of parts of the rotor creating losses is obtained by feeding the cooling liquid in the rotor, and in the stator in that good thermal contact between stator winding and cooling liquid is guaranteed thanks to direct cooling. Further, no precision spraying is required as the distribution of the cooling liquid is effected by means of rotation of the rotor and via the rotor.

According to an embodiment of the method said rotor comprises peripherally arranged feeding spaces for said cooling liquid from which said liquid is thrown towards said stator. Hereby efficient transportation of cooling liquid is facilitated for efficient cooling of parts of the rotor creating losses and efficient cooling of the stator and its windings.

According to an embodiment of the method said liquid is thrown towards an end portion of the stator comprising the coil ends of the windings of the stator. Hereby efficient cooling of the stator is facilitated, the coil ends of the windings of the stator constituting the hottest portions and consequently having the greatest need for cooling of the stator.

According to an embodiment of the method said hub comprises an internal liquid collecting surface for retaining of the cooling liquid for said feeding of the cooling liquid in said hub. Hereby efficient retaining of cooling liquid is facilitated for further feeding in said feeding spaces for cooling of the rotor and throwing of the cooling liquid via said feeding spaces for cooling of the stator.

According to an embodiment of the method said internal liquid collecting surface runs internally and axially tapering in the direction from said end. Hereby efficient retaining and conducting of liquid cooling is obtained during rotation of the rotor for further feeding in said feeding spaces for liquid cooling of rotor and throwing of cooling liquid via said feeding spaces for cooling of stator.

According to an embodiment of the method said liquid collecting surface is essentially conical. Hereby efficient conduction of cooling liquid towards feeding space is obtained for feeding in said feeding spaces for cooling of rotor and throwing of cooling liquid for cooling of stator. Further conical shape facilitates relatively simple manufacturing.

According to an embodiment of the method said internal liquid collecting surface comprises a rim running at said end for said retention. Hereby efficient retaining of cooling liquid is facilitated for further feeding in said feeding spaces for cooling of the rotor and throwing of the cooling liquid via said feeding spaces for cooling of the stator.

According to the invention the objects are achieved with a device for liquid cooling of an electric motor of inner rotor type comprising a rotor of hub type and a stator provided with windings, comprising means for supplying a liquid for said cooling to at least one end of the hub of said rotor and means for feeding supplied cooling liquid at least radially in said hub by means of the rotation of said hub, and by means of the rotation of the rotor throw thus fed cooling liquid towards said stator. Hereby the liquid for cooling comes into direct contact or in the vicinity of parts of the rotor creating losses, to thereafter be thrown towards the stator, particularly the stator windings and its coil ends, wherein consequently efficient cooling of parts of the rotor creating losses is obtained by feeding the cooling liquid in the rotor, and in the stator in that good thermal contact between stator winding and cooling liquid is guaranteed thanks to direct cooling. Further, no precision spraying is required as the distribution of the cooling liquid is effected by means of rotation of the rotor and via the rotor.

According to an embodiment of the device said rotor comprises peripherally arranged feeding spaces for said liquid from which said liquid is arranged to be thrown towards said stator. Hereby efficient transportation of cooling liquid is facilitated for efficient cooling of parts of the rotor creating losses and efficient cooling of the stator and its windings.

According to an embodiment of the device said liquid is arranged to be thrown towards an end portion of the stator comprising the coil ends of the windings of the stator. Hereby efficient cooling of the stator is facilitated, the coil ends of the windings of the stator constituting the hottest portions and consequently having the greatest need for cooling of the stator.

According to an embodiment of the device said hub comprises an internal liquid collecting surface for retaining of the cooling liquid for said feeding of the cooling liquid in said hub. Hereby efficient retaining of cooling liquid is facilitated for further feeding in said feeding spaces for cooling of the rotor and throwing of the cooling liquid via said feeding spaces for cooling of the stator.

According to an embodiment of the device said internal liquid collecting surface is arranged to run internally and axially tapering in the direction from said end. Hereby efficient retaining and conducting of liquid cooling is obtained during rotation of the rotor for further feeding in said feeding spaces for liquid cooling of rotor and throwing of cooling liquid via said feeding spaces for cooling of stator.

According to an embodiment of the device said liquid collecting surface is essentially conical. Hereby efficient conduction of cooling liquid towards feeding space is obtained for feeding in said feeding spaces for cooling of rotor and throwing of cooling liquid for cooling of stator. Further conical shape facilitates relatively simple manufacturing.

According to an embodiment of the device said internal liquid collecting surface comprises a rim running at said end for said retention. Hereby efficient retaining of cooling liquid is facilitated for further feeding in said feeding spaces for cooling of the rotor and throwing of the cooling liquid via said feeding spaces for cooling of the stator.

BRIEF DESCRIPTION OF THE DRAWINGS

A better understanding of the present invention will be had upon the reference to the following detailed description when read in conjunction with the accompanying drawings, wherein like reference characters refer to like parts throughout the several views, and in which.

DETAILED DESCRIPTION OF THE INVENTION

Figure 1:
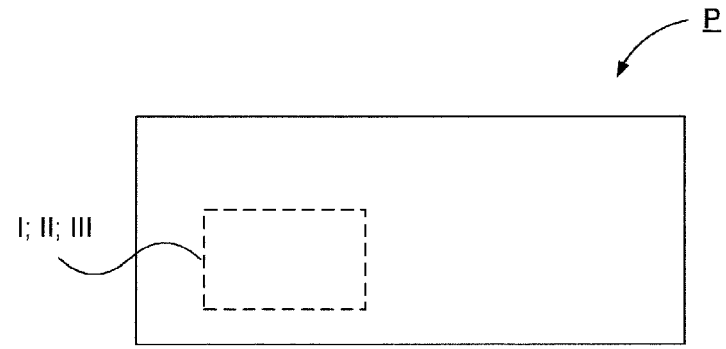
FIG. 1 schematically illustrates a motor vehicle according to an embodiment of the present invention.

With reference to FIG. 1 a platform P is shown, the platform P being comprised in a group comprising motor vehicles such as military vehicles, work vehicles, private car, boat, helicopter or the corresponding, a power station, any electrically driven machine or the corresponding, the device comprising an electric motor for driving of the same. The platform P comprises at least one electric motor 1; 2; 3 comprising a device I; II; III for liquid cooling of the electric motor 1 according to the present invention.

Figure 2:
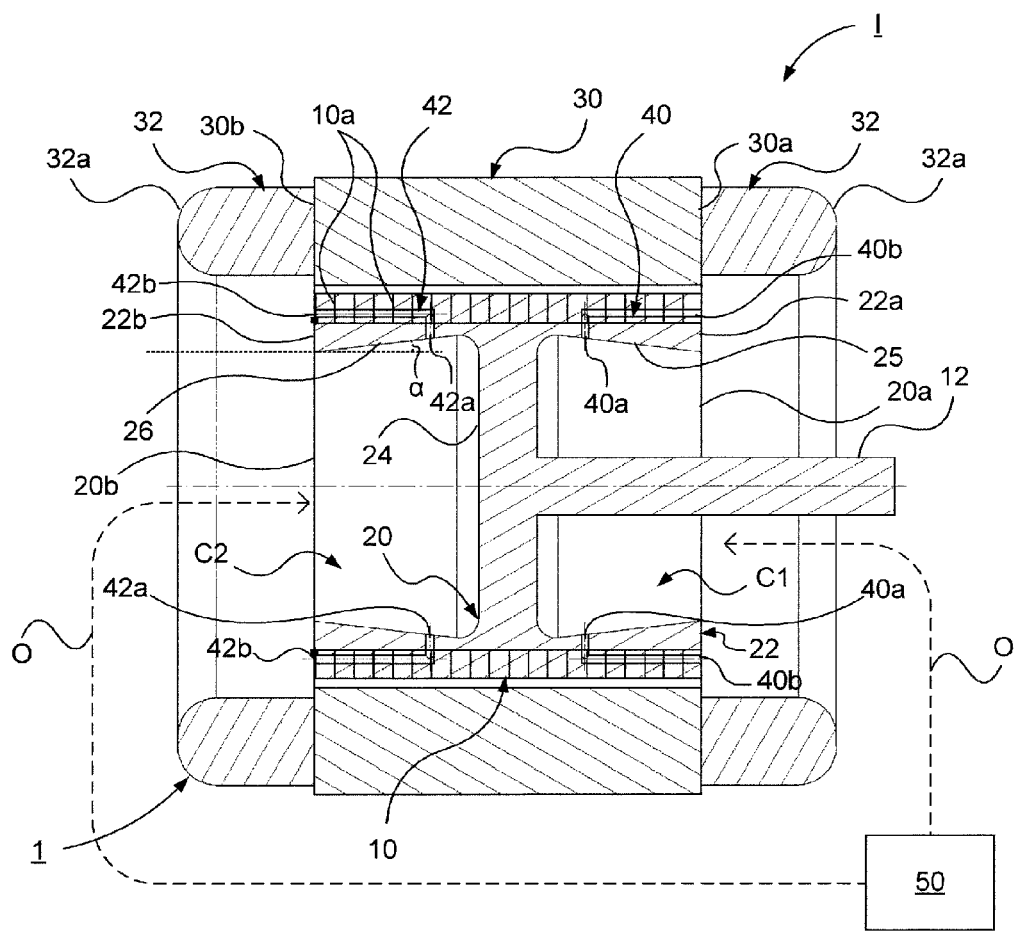
FIG. 2 schematically illustrates a side view of an axial cross section of an electric motor with a device for liquid cooling of the electric motor according to an embodiment of the present invention.
Figure 3:
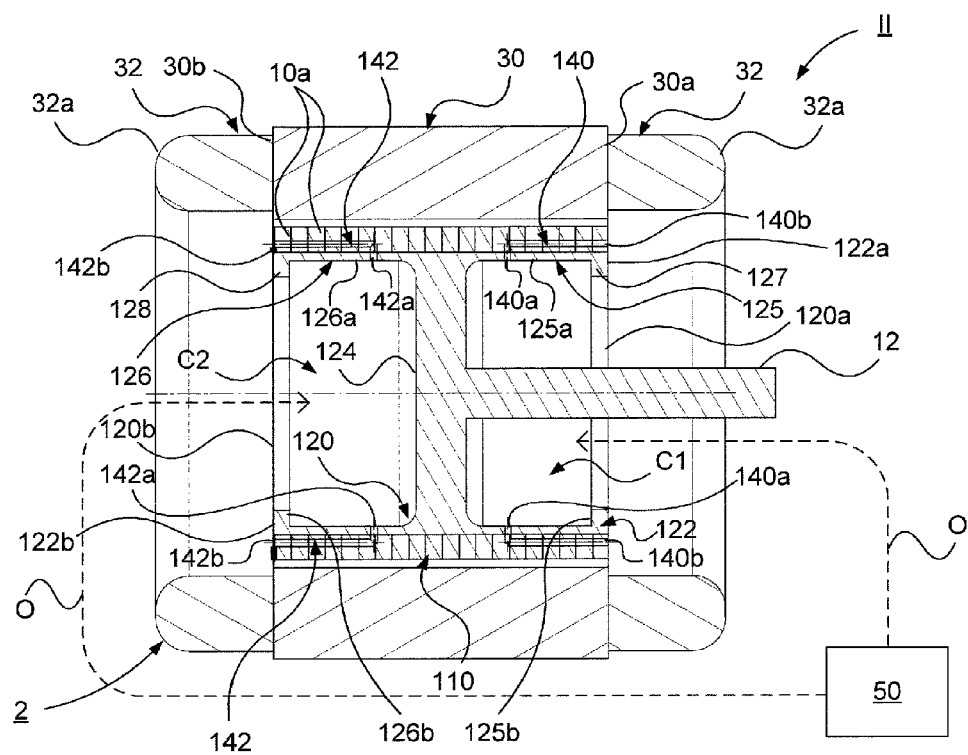
FIG. 3 schematically illustrates a side view of an axial cross section of an electric motor with a device for liquid cooling of the electric motor according to an embodiment of the present invention.
Figure 4:
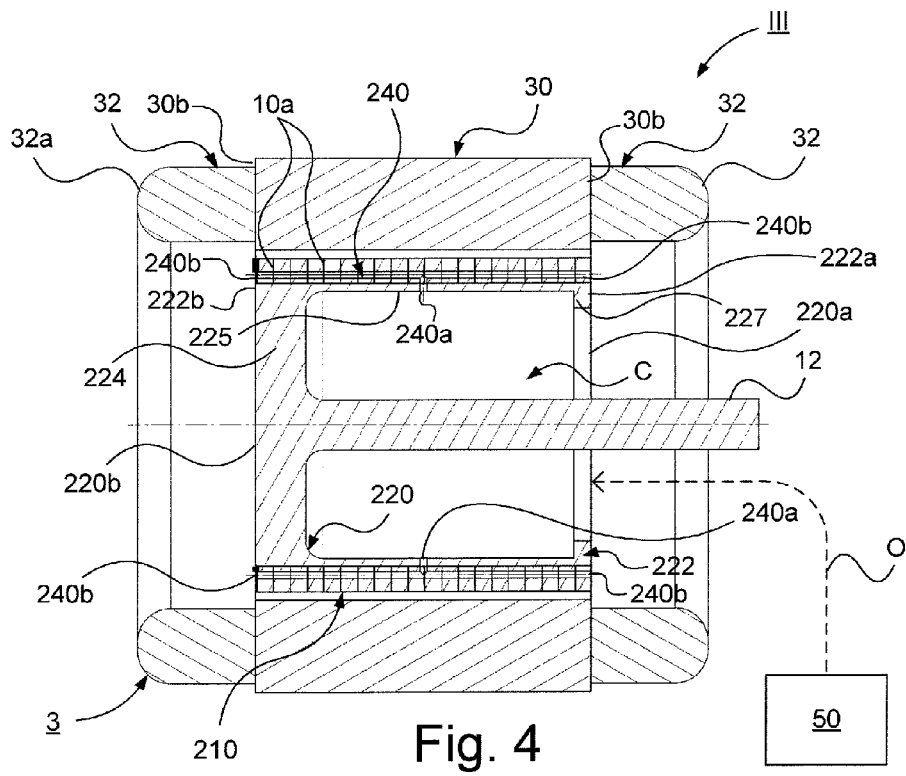
FIG. 4 schematically illustrates a side view of an axial cross section of an electric motor with a device for liquid cooling of the electric motor according to an embodiment of the present invention.

FIG. 2-4 schematically show a side view of an axial cross section of an electric motor 1; 2; 3 with a device I; II; III for liquid cooling of the electric motor 1; 2; 3 according to different embodiments of the present invention.

The electric motor 1; 2; 3 is of inner rotor type comprising a rotor 10; 110; 210 of hub type and a stator 30 provided with windings. With electric motor of inner rotor type is intended an electric motor where the stator 30 is arranged to surround the rotor 10; 110; 210. The external surface of the rotor 10; 110; 210 is arranged adjacent to and separated from the internal surface of the stator 30. The rotor 10; 110; 210 is according is according to a variant built up by stacked rotor plates 10*a*.

The rotor is consequently of so called hub type, i.e. the rotor 10; 110; 210 comprises a hub 20; 120; 220, below denoted hub member 20; 120; 220. Said hub member 20; 120; 220 comprises an axially running ring shaped cylindrical portion 22; 122; 222 with a first end 22*a*; 122*a*; 222*a* and an opposite second end.

Said rotor 10; 110; 210 is connected to a drive shaft 12 and arranged to rotate said drive shaft 12 and constitutes a rotor shaft 12. Said rotor shaft 12 is integrated in said hub member 20; 120; 220. Said hub member 20; 120; 220 has an internal and radially inwardly from said ring shaped portion 22; 122; 222 running wall portion 24; 124; 224. Said rotor shaft 12 is arranged to protrude from said wall portion 24; 124; 224. Said wall portion 24; 124; 224 is perpendicularly arranged relative to the axial extension of the electric motor 1; 2; 3 and consequently perpendicular relative to the extension of said ring shaped portion 22; 122; 222. The ring shaped portion 22; 122; 222 of the hub member forms a hub member space C1, C2; C in which said wall portion 24; 124; 224 forms an inner wall. The hub member 20; 120; 220 has a first end 20*a*; 120*a*; 220*a* and an opposite second end 20*b*; 120*b*; 220*b*.

The rotor shaft 12 is arranged to run concentrically relative to said ring shaped portion 22; 122; 222 of the hub member 20; 120; 220, wherein the cylindrical portion is arranged to surround the rotor shaft 20.

The rotor 10; 110; 210 comprises according to a variant rotor plates 10*a* stacked on each other and arranged to run radially outwardly from said hub member 20; 120; 220. The rotor plates 10*a* are consequently arranged externally to the ring shaped portion of the hub member 20; 120; 220. The rotor plates 10*a* are arranged externally on the cylindrical portion of the hub member 20; 120; 220. The rotor plates 10*a* are according to a variant laminated.

The rotor shaft 12 and consequently the rotor 20; 120; 220 are arranged concentrically relative to the stator 30.

The stator 30 is according to a variant built up by stacked stator plates (not shown). The stator 30 comprises a stator winding 32. The stator winding comprises according to a variant a set of electrically conductive wires/conductors, through which a current is arranged to be conducted for driving of the electric motor 1; 2; 3. Said conductors may be of different thickness. Said stator winding 32 is arranged to run axially such that the winding adjoins adjacently to the rotor 10; 110; 210. The stator winding 32 is arranged to axially project form end portions 30a, 30b of the stator 30, turn outside the end portions 30a, 30b and be re-introduced through the end portions, wherein said projecting portion 32a of the stator winding 32 forms a so called coil end 32b.

Copper wires of the winding 32 is according to a variant arranged to run axially in compartments/recesses of the stator plates and be conducted out from end portions of the stator 30 and back into another compartment/another recess of the stator plates.

The stator winding 32 of the stator 30 is according to the present invention arranged to run along and axially projecting from and turn outside of the jacket surface of the stator 30.

The respective end 20a; 120a; 220a, 20b; 120b; 220b of said hub member 20; 120; 220 of the rotor is arranged to receive a liquid cooling medium O, i.e. a liquid for cooling of the electric motor. The liquid cooling medium O is according to a variant constituted by oil. The liquid cooling medium O is arranged to be led to the respective end of the hub member 20; 120; 220 of the rotor 10; 110; 210 and into said hub member space C1, C2; C for cooling of said rotor 10; 110; 210 and stator 30. Said hub member 20; 120; 220 comprises an internal liquid collecting surface 25, 26; 125, 126; 225 arranged in the hub member space C1, C2; C for receiving and collecting said towards the respective end of the hub member 20; 120; 220 of the rotor supplied cooling liquid O.

The device I; II; III for liquid cooling of the electric motor 1; 2; 3 comprises means 50 for supplying the liquid medium/the liquid for said cooling to at least one end of the hub member 20; 120; 220 of said rotor and means for feeding supplied liquid at least radially in said hub member 20; 120; 220, and by means of the rotation of the rotor throw thus fed cooling liquid O towards said stator.

The means 50 for supply of liquid O comprises according to a variant at least one pump arranged to pump liquid O from a sump in a not shown housing for the electric motor 1; 2; 3. Where the liquid is constituted by oil the sump thus is constituted by an oil sump.

According to a variant the pump is connected to the electric motor in such a way that the pump is activated by driving of the electric motor such that cooling liquid O may be supplied to the respective end of the hub member of said rotor when there is a need, i.e. when the electric motor is driven such that the rotor rotates.

Said rotor 10; 110; 210 comprises peripherally arranged feeding spaces 40, 42; 140, 142; 240 for said liquid O from which said liquid is arranged to be thrown towards said stator 30. Said feeding spaces 40, 42; 140, 142; 240 comprise according to a variant a channel configuration arranged to run from inside the hub member space C1, C2; C via inlets 40a, 42a; 140a, 142a, 240a and further essentially axially in the rotor in connection to parts of the rotor creating losses for cooling of these and further out towards outlets 40b, 42b; 140b, 142b, 240b in connection to an end portion of the rotor 10; 110; 210.

Said feeding spaces 40, 42; 140, 142; 240 for said liquid O are arranged to run from said internal liquid collecting surface 25, 26; 125, 126; 225. Said inlet 40a, 42a; 140a, 142a, 240a are arranged in connection to the internal liquid collecting surface 25, 26; 125, 126; 225. Said feeding spaces 40, 42; 140, 142; 240 are according to a variant comprised by said means for feeding supplied cooling liquid at least radially in said hub member 20; 120; 220.

Said internal liquid collecting surface 25, 26; 125, 126; 225 is arranged to receive and collect the cooling liquid supplied by means of said means 50 for retaining of the cooling liquid O for further feeding of the cooling liquid in said hub member 20; 120; 220. Said internal liquid collecting surface 25, 26; 125, 126; 225 is according to a variant comprised by said means for feeding supplied cooling liquid at least radially in said hub member 20; 120; 220.

The rotation of the hub member 20; 120; 220 is according to a variant comprised by said means for feeding supplied cooling liquid at least radially in said hub member 20; 120; 220.

Said channel configuration may be shaped in any suitable way with one or several inlets and one or several outlets and run in any suitable way through the rotor for cooling of the rotor and its parts creating losses. Said feeding spaces 40, 42; 140, 142; 240 have according to an embodiments channel portions 40, 42; 140, 142; 240 arranged to run from said inlet to said outlet essentially axially through said rotor plates 10a for cooling of parts creating losses.

Said liquid is arranged to be thrown towards an end portion of the stator 30 comprising the coil ends 32a of the stator winding 32. Said outlet 40b, 42b; 140b, 142b, 240b of the channel configuration is/are hereby arranged in connection to the coil ends 32a of the stator winding. Said outlet 40b, 42b; 140b, 142b; 240 is/are arranged at least at one end of the rotor.

FIG. 2 schematically illustrates a side view of an axial cross section of an electric motor 1 with a device I for liquid cooling of the electric motor 1 according to an embodiment of the present invention.

In the embodiment according to FIG. 2 said wall portion 24 running internally and radially from said ring shaped portion 22 of the hub member 20 is arranged centrally such that it divides the ring shaped portion 22 such that a first hub member space C1 and a second hub member space C2 are formed. Said rotor shaft 12 is arranged to project from said wall portion 24. According to this embodiment the rotor shaft 12 is arranged to project from the first hub member space C1. According to a not shown variant said rotor shaft could project also in the opposite direction through the second hub member space.

Said wall portion 24 is perpendicularly arranged relative to the axial extension of the electric motor 1 and consequently perpendicular relative to the extension of said ring shaped portion 22. The hub member 20 has a first end 20a and an opposite second en 20b.

Said feeding spaces 40, 42 comprises according to this embodiment a channel configuration comprising at least one in the first hub member space S1 arranged channel portion 40 with inlets 40a arranged in the hub member space S1 on the ring shaped portion 22 of the hub member 20 in an area adjacent to the wall portion 24 and outlet 40b arranged at the end of the rotor 10 in connection to the first end portion 22a of the ring shaped portion 22 of the hub member 20, wherein the channel portion 40 is arranged to run from said inlet 40a to said outlet 40b.

Correspondingly the channel configuration comprises at least one in the second hub member space S2 arranged channel portion 42 with inlets 42a arranged in the hub member space S2 on the ring shaped portion 22 of the hub member 20 in an area adjacent to the wall portion 24 and outlet 42b arranged at the end of the rotor 10 in connection to the second end portion 22b of the ring shaped portion 22 of the hub member 20, wherein the channel portion is arranged to run from said inlet to said outlet.

Said hub member 20 comprises according to this embodiment an internal liquid collecting surface 25, 26 running internally and axially tapering from the respective end portion of the hub member 20 towards the wall portion 24. Said internal liquid collecting surface 25, 26 is arranged to receive and collect the cooling liquid O supplied by means of said means 50 for retaining of the cooling liquid O for further feeding of the cooling liquid in said hub member 20. Said inlet 40a constitutes opening/openings in the liquid collecting surface 25. Said inlet 40b constitutes opening/openings in the liquid collecting surface 26.

According to a variant said liquid collecting surface 25, 26 is according to a variant essentially conical. Hereby the surface 25, 26 in cross section forms an angle α relative to the axial extension of the electric motor 1. The inner radius on the hub member 20 thus increases in the direction from the respective end 20a, 20b and inwardly towards the wall portion 24. Due to the fact that said internal liquid collecting surface 25, 26 is arranged to run internally and axially tapering in the direction from said end cooling liquid sprayed/thrown/flushed into the respective hub member space C1, C2 will by rotation of the rotor migrate from the respective end 20a, 20b and inwardly in the hub member space C1, C2, wherein the cooling liquid O through the centrifugal force due to the rotation of the rotor 10 and consequently the rotation of the hub member 20 is pressed into the respective inlet 40a, 42a of the channel configuration and thereby is led in the rotor for cooling of parts creating losses in the rotor and out towards the respective outlet 40b, 42b for cooling of the windings 32 of the stator 30 comprising the coil ends 32a of the stator windings 32. Hereby efficient cooling of both stator and rotor is obtained.

FIG. 3 schematically illustrates a side view of an axial cross section of tan electric motor 2 with a device II for liquid cooling of the electric motor 2 according to an embodiment of the present invention.

The embodiment according to FIG. 3 differs from the embodiment according to FIG. 2 essentially by the shape of the internally liquid collecting surface 125, 126. The internal liquid collecting surface 125, 126 comprises a rim running at the respective end 120a, 120b of the hub member 120 for collection and retention of cooling liquid supplied to the respective hub member space C1, C2. Said rim 127, 128 running at the respective end 120a, 120b are consequently arranged to prevent that cooling liquid supplied to the respective hub member space C1, C2 leaves the space C1, C2 by the liquid O being stopped by the rim 127, 128. Said rim 125, 126 of the liquid collecting surface 125, 126 is according to this embodiment arranged to run essentially perpendicular to the axial extension of the electric motor 2.

Said internal liquid collecting surface 125, 126 is consequently arranged to receive and collect the supplied cooling liquid O for retaining of the cooling liquid O for further feeding of the cooling liquid in said hub member 120.

The ring shaped portion 122 of the hub member 120 consequently has an inner surface 125, 126 with a surface portion 125a, 126a running essentially axially from the wall portion and a surface portion 125b, 126b at the respective end portion 122a, 122b running essentially radially inwardly towards the centre portion of the electric motor 2 of said rim 127, 128. The respective circumferential rim 127, 128 running perpendicular to the axial extension of the electric motor 2 consequently has a radius which is smaller than the radius of said axially running surface portion 125a, 126a. The respective rim 127, 128 constitute the respective end 122a, 122b of the hub member 122.

Said inlets 140a, 142a are arranged in the essentially axially running surface portion 125a, 126a of the liquid collecting surface 125, 126.

By the shape of said liquid collecting surface 125, 126 with the rim 127, 128 arranged at the respective end portion 120a, 120b cooling liquid that is sprayed/thrown/flushed into the respective hub member space C1, C2 will be collected in the respective hub member space C1, C2. During rotation of the rotor 10 by the centrifugal force due to the rotation of the rotor 10 and consequently the rotation of the hub member 120 the cooling liquid O will be pressed into the respective inlet 140a, 142a of the channel configuration and thereby be led in the rotor 10 for cooling of parts creating losses in the rotor 10 and out towards the respective outlet 140b, 142b for cooling of the windings 32 of the stator 30 comprising the coil ends 32a of the stator windings 32. Hereby efficient cooling of both stator and rotor is obtained.

Said rim 127, 128 for collection and retention of cooling liquid O supplied to the respective hub member space C1, C2 is according to the embodiment illustrated in FIG. 3 arranged to run essentially perpendicular to the axial extension of the electric motor 2 and consequently essentially perpendicular relative to the surface portion 125a, 126a of said liquid collecting surface 125, 126. Said rim 127, 128 may have any suitable angle relative to the axial extension of the electric motor 2/surface portion 125a, 126a.

FIG. 4 schematically illustrates a side view of an axial cross section of an electric motor 3 with a device III for liquid cooling of the electric motor 3 according to an embodiment of the present invention.

The embodiment according to FIG. 4 differs from the embodiment according to FIG. 3 essentially by the shape of the hub member 220. According to the embodiment in FIG. 4 the wall portion 22 is arranged in one end of the rotor 210. Hereby the hub member 220 according to this embodiment only has one hub member space C with an internally liquid collecting surface 225.

Said feeding space 240 according to this embodiment comprises a channel configuration comprising at least one in the hub member space C arranged channel portion 240 with inlet 240a arranged in the hub member space C on the ring shaped portion 222 of the hub member 220 in a central portion of the hub member space C and outlet 240b arranged in connection to the respective end portion 222a, 222b of the ring shaped portion 222 of the hub member 220, i.e. in connection to the respective end 220a, 220b of the hub member, wherein the channel portion 240 is arranged to run from said inlet 240a to said outlet 240b.

The internal liquid collecting surface 225 according to the embodiment in FIG. 4 is shaped in accordance with the liquid collecting surface 125 according to the embodiment in FIG. 3 with a rim 227 running at the end 220a of the hub member 220. The internal liquid collectin surface 225 of the device III could alternatively be shaped in accordance with the liquid collecting surface 25 according to the embodiment in FIG. 2.

Figure 5:
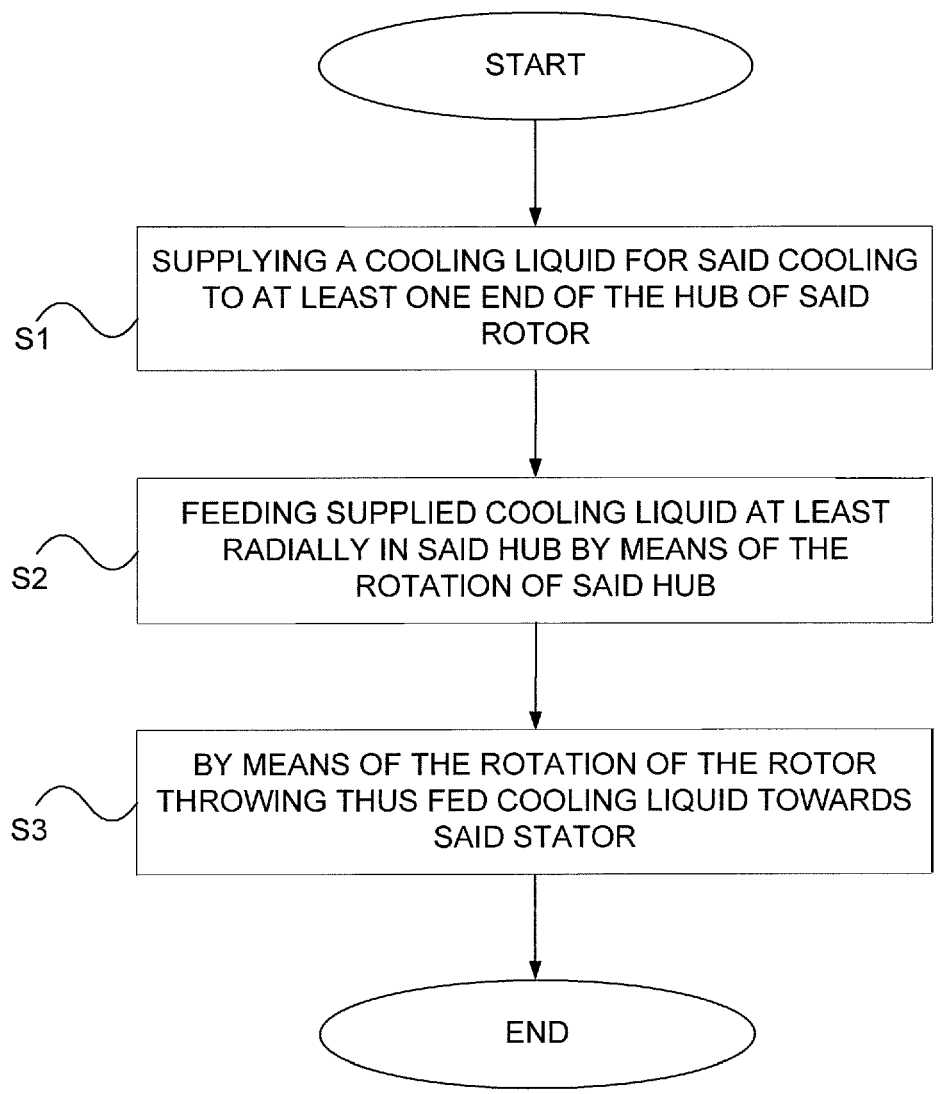
FIG. 5 schematically illustrates a block diagram of a method for liquid cooling of an electric motor according to an embodiment of the present invention.

FIG. 5 schematically illustrates a block diagram of a method for liquid cooling of an electric motor of inner rotor type comprising a rotor of hub type and a stator provided with windings according to an embodiment of the present invention.

According to an embodiment the method for liquid cooling of such an electric motor comprises a first step S1. In this step a liquid for said cooling is supplied to at least one end of the hub of said rotor.

According to an embodiment the method for liquid cooling of such an electric motor comprises a second step S2. In this step supplied cooling liquid is fed at least radially in said hub by means of the rotation of said hub.

According to an embodiment the method for liquid cooling of such an electric motor comprises a third step S3. In this step thus fed cooling liquid is thrown by means of the rotation of the rotor towards said stator.

The electric motor according to the preset invention may be any suitable inner rotor motor of hub design such as an asynchronous motor or a permanent magnet motor.

Said feeding space comprising channel configuration for feeding through the rotor for cooling of parts in the rotor creating losses and throwing of cooling liquid outlets to stator winding may as mentioned have any suitable configuration and be led in the rotor in any suitable way.

In an asynchronous motor the channel portions of the channel configuration are arranged either next to the rotor basket which is formed by a cast aluminium winding, i.e. next to the rotor plates, or in the actual rotor basket. In the aluminium winding a current runs, resulting in the temperature in the rotor basket increasing, wherein the resistance increases, wherein the rotor basket consequently constitutes a part creating losses.

In a permanent magnet motor the channel portions of the channel configuration according to a variant are arranged to be led between the magnets of the motor in order to thus also cool the magnets. On a permanent magnet motor, i.e. an electric motor with magnets in the rotor, losses are created in the magnets. The magnets are temperature sensitive and thereby the component in the electric motor that will limit the allowed temperature. The magnets hereby constitute parts creating losses.

The parts creating losses often lie just below the jacket surface on the rotor. Said feeding space comprising channel configuration for feeding through the rotor for cooling of parts creating losses in the rotor is thereby according to a variant arranged just below the jacket surface on the rotor.

The foregoing description of the preferred embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated.

The invention claimed is:

1. A method for liquid cooling of an inner rotor electric motor comprising a rotor having a hub and a stator provided with windings, the method comprising the steps of:
   supplying a cooling liquid, without passing through a rotor shaft of the rotor, for said cooling to at least one end of the hub of said rotor;
   feeding supplied cooling liquid at least radially in said hub by means of a rotation of said hub, wherein the hub comprises an internal liquid collecting surface which forms an angle relative to an axial extension of the electric motor, wherein an inner radius of the hub increases in a direction from a respective end of the hub axially inwardly towards a wall portion of the hub, for retaining of the cooling liquid for said feeding of the cooling liquid in said hub; and
   by means of a rotation of the rotor throwing thus fed cooling liquid towards said stator.

2. A method according to claim 1, wherein said rotor comprises peripherally arranged feeding spaces for said cooling liquid from which said liquid is thrown towards said stator.

3. A method according to claim 1, wherein said liquid is thrown towards an end portion of the stator comprising the coil ends of the stator windings.

4. A method according to claim 1, wherein said internal liquid collecting surface runs internally and axially tapering in the direction from said end.

5. A method according to claim 1, wherein said liquid collecting surface is conical.

6. A method according to claim 1, wherein said internal liquid collecting surface comprises a rim running at said end for said retention.

7. A device for liquid cooling of an inner rotor electric motor comprising a rotor having a hub and a stator provided with windings, the device comprising:
   at least one pump for supplying a cooling liquid, without passing through a rotor shaft of the rotor, to at least one end of the hub of said rotor; and
   a channel configuration for feeding supplied cooling liquid at least radially in said hub by means of a rotation of said hub, and by means of a rotation of the rotor throwing thus fed cooling liquid towards said stator, wherein the hub comprises an internal liquid collecting surface which forms an angle relative to an axial extension of the electric motor, wherein an inner radius of the hub increases in a direction from a respective end of the hub axially inwardly towards a wall portion of the hub, for retaining of the cooling liquid for said feeding of the cooling liquid in said hub.

8. A device according to claim 7, wherein said rotor comprises peripherally arranged feeding spaces for said liquid from which said liquid is thrown towards said stator.

9. A device according to claim 7, wherein said liquid is arranged to be thrown towards an end portion of the stator comprising the coil ends of the stator windings.

10. A device according to claim 7, wherein said internal liquid collecting surface is arranged to run internally and axially tapering in the direction from said end.

11. A device according to claim 7, wherein said liquid collecting surface is essentially conical.

12. A device according to claim 7, wherein said internal liquid collecting surface comprises a rim running at said end for said retention.

13. A platform comprising a device according to claim 7.

* * * * *